(12) United States Patent
Lerner et al.

(10) Patent No.: US 10,963,530 B1
(45) Date of Patent: Mar. 30, 2021

(54) CLUSTERING AND CORANKING OF MULTI-SOURCE LOCATION DATA

(71) Applicant: GROUPON, INC., Chicago, IL (US)

(72) Inventors: Boris Lerner, Chicago, IL (US); Leopold Silberstein, Chicago, IL (US); Emma Sawin, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 184 days.

(21) Appl. No.: 16/192,197

(22) Filed: Nov. 15, 2018

Related U.S. Application Data

(60) Provisional application No. 62/587,881, filed on Nov. 17, 2017.

(51) Int. Cl.
| | |
|---|---|
| *G06F 16/00* | (2019.01) |
| *G06F 16/9537* | (2019.01) |
| *G06K 9/62* | (2006.01) |
| *G06F 16/28* | (2019.01) |
| *G06F 16/9535* | (2019.01) |
| *G06F 16/2457* | (2019.01) |

(52) U.S. Cl.
CPC .... *G06F 16/9537* (2019.01); *G06F 16/24578* (2019.01); *G06F 16/285* (2019.01); *G06F 16/9535* (2019.01); *G06K 9/6223* (2013.01)

(58) Field of Classification Search
CPC ............. G06F 16/9537; G06F 16/9535; G06F 16/285; G06F 16/24578; G06F 16/00; G06F 17/30; G06F 16/2379; G06F 16/2385; G06F 16/27; G06F 16/219; G06F 16/284; G06F 16/2365; G06F 16/2474; G06F 16/215; G06F 17/30377; G06Q 30/0205; G06Q 30/0207; G06Q 30/018; G06Q 50/01; G06Q 50/24; G06K 9/6223; H04L 9/0637; H04L 9/3239; H04L 63/00; H04L 9/0894; H04L 2209/38

See application file for complete search history.

(56) References Cited

U.S. PATENT DOCUMENTS

| | | | | |
|---|---|---|---|---|
| RE43,114 E | * | 1/2012 | Walker | G07F 17/3293 463/13 |
| 8,595,308 B1 | * | 11/2013 | Kloba | H04L 67/04 709/207 |
| 2005/0234774 A1 | * | 10/2005 | Dupree | G06Q 30/0272 705/14.57 |
| 2013/0218815 A1 | * | 8/2013 | Nugent | G06N 5/02 706/12 |

(Continued)

*Primary Examiner* — Anh Ly
(74) *Attorney, Agent, or Firm* — Alston & Bird LLP

(57) ABSTRACT

A method, computer program product, and apparatus for determining improved data objects are provided. An example method receives a request for a renderable data object from a location source device associated with a user profile including instant location data. The method queries an explicit locations database and an implicit locations database and coranks this multisource locations data. The method compares the coranked locations with one or more object redemption locations of each renderable data object. The method determines a proximity score for each renderable data object and ranks each renderable data object based upon proximity score. The method then identifies a proximate data object having a minimum proximity score and transmits the proximate data object to the location source device.

20 Claims, 8 Drawing Sheets

(56) References Cited

U.S. PATENT DOCUMENTS

| | | | |
|---|---|---|---|
| 2013/0307843 A1* | 11/2013 | Sikka | G06F 16/26 345/419 |
| 2014/0025770 A1* | 1/2014 | Warfield | G06F 16/256 709/213 |
| 2014/0229493 A1* | 8/2014 | Hong | G06F 16/9024 707/748 |
| 2014/0278691 A1* | 9/2014 | Schenken | G06Q 20/407 705/7.22 |
| 2015/0032511 A1* | 1/2015 | Haddad | G06Q 30/0205 705/7.34 |
| 2015/0379121 A1* | 12/2015 | Akolkar | G06Q 30/0625 707/723 |
| 2016/0003637 A1* | 1/2016 | Andersen | G06Q 10/10 701/519 |
| 2016/0125456 A1* | 5/2016 | Wu | G06Q 30/0251 705/14.49 |
| 2016/0170998 A1* | 6/2016 | Frank | G06Q 30/0251 707/748 |
| 2017/0032249 A1* | 2/2017 | Chougule | G06F 16/288 |
| 2018/0307753 A1* | 10/2018 | Guo | G06F 16/638 |
| 2020/0036783 A1* | 1/2020 | Bourassa | G06F 16/9035 |

* cited by examiner

US 10,963,530 B1

CLUSTERING AND CORANKING OF MULTI-SOURCE LOCATION DATA

CROSSREFERNCE TO RELATED APPLICATIONS

This application claims the benefit of U.S. Provisional Application No. 62/587,881, filed Nov. 17, 2017, which is hereby incorporated by reference.

TECHNOLOGICAL FIELD

Various embodiments of the present invention relate generally to modeling, e.g., using machine learning models, to determine improved renderable data objects using clustering and co-ranking of multi-source location data.

BACKGROUND

Various conventional systems attempt to model and predict device interactions using location data. Applicant has identified a number of deficiencies and problems associated with such conventional systems and associated computing devices. Through applied effort, ingenuity, and innovation, solutions for improving the modeling of renderable data objects have been realized and are described herein.

BRIEF SUMMARY

A method for determining improved data objects is provided. The method may include receiving a request for a renderable data object from a location source device associated with a user profile and receiving instant location data associated with the location source device. The method may include querying an explicit locations database associated with the user profile to identify explicit locations data and generating an explicit locations data set based on the explicit locations data as well as querying an implicit locations database associated with the user profile to identify implicit locations data and generating an implicit locations data set based on the implicit locations data and the instant location data of the location source device. The method may further include coranking the explicit locations data set and the implicit locations data set to generate a coranked locations data set comprising one or more coranked locations and querying a renderable objects database to generate a set of one or more renderable data objects based upon the one or more coranked locations of the coranked locations data set where each of the one or more renderable data objects is associated with one or more object redemption locations. The method may include comparing the one or more coranked locations of the coranked locations data set with each of the one or more object redemption locations of each of the one or more renderable data objects to determine a proximity score for each of the renderable data objects with respect to each of the one or more coranked locations and ranking each of the one or more renderable data objects based upon proximity score to generate a proximate object set. The method may further include identifying a proximate data object, where the proximate data object of the proximate object set comprises the renderable data object having a minimum proximity score and transmitting the proximate data object to the location source device.

In some embodiments, the coranking of the explicit locations data set and the implicit locations data set may also including comparing the explicit locations data set with the implicit locations data set to determine one or more verified locations in an instance in which the explicit locations data and the implicit locations data satisfy a proximity threshold. The method may further include generating the coranked locations data set by first ranking the one or more verified locations, second ranking the implicit locations data that does not satisfy the proximity threshold, and third ranking the explicit locations data that does not satisfy the proximity threshold.

In some cases, the explicit locations data of the explicit locations database may include location data corresponding to one or more of the billing address, the shipping address, and/or the social media of the user profile associated with the location source device.

In some other cases, upon identifying a proximate data object, the method may further include supplying the proximate data object to a predictive model in order to improve subsequent determinations of improved data objects.

In other embodiments, the implicit locations database may include implicit locations data gathered via one or more previous requests for a renderable data object by the location source device.

In some embodiments, the implicit locations data and the explicit locations data are grouped via a clustering method. In such an embodiment, the implicit locations data may be further grouped via a modified k-means clustering method, where the location data associated with requests for a renderable data object by the location source device having a lower time stamp are ranked higher relative other implicit locations data.

A computer program product including at least one non-transitory computer-readable storage medium having computer-executable program code instructions stored therein is provided. The computer-executable program code instructions may include program code instructions for receiving a request for a renderable data object from a location source device associated with a user profile and receiving instant location data associated with the location source device. The computer-executable program code instructions may include program code instructions for querying an explicit locations database associated with the user profile to identify explicit locations data and generating an explicit locations data set based on the explicit locations data as well as querying an implicit locations database associated with the user profile to identify implicit locations data and generating an implicit locations data set based on the implicit locations data and the instant location data of the location source device. The computer-executable program code instructions may include program code instructions for further coranking the explicit locations data set and the implicit locations data set to generate a coranked locations data set comprising one or more coranked locations and querying a renderable objects database to generate a set of one or more renderable data objects based upon the one or more coranked locations of the coranked locations data set where each of the one or more renderable data objects is associated with one or more object redemption locations The computer-executable program code instructions may include program code instructions for comparing the one or more coranked locations of the coranked locations data set with each of the one or more object redemption locations of each of the one or more renderable data objects to determine a proximity score for each of the renderable data objects with respect to each of the one or more coranked locations and ranking each of the one or more renderable data objects based upon proximity score to generate a proximate object set. The computer-executable program code instructions may include further program code instructions for identifying a proximate data object, where the proximate data object of the proximate object set comprises the renderable data object having a minimum proximity score and transmitting the proximate data object to the location source device.

In some embodiments, the coranking of the explicit locations data set and the implicit locations data set may also including comparing the explicit locations data set with the implicit locations data set to determine one or more verified locations in an instance in which the explicit locations data and the implicit locations data satisfy a proximity threshold. The computer-executable program code instructions may include further program code instructions for generating the coranked locations data set by first ranking the one or more verified locations, second ranking the implicit locations data that does not satisfy the proximity threshold, and third ranking the explicit locations data that does not satisfy the proximity threshold.

In some cases, the explicit locations data of the explicit locations database may include location data corresponding to one or more of the billing address, the shipping address, and/or the social media of the user profile associated with the location source device.

In some other cases, upon identifying a proximate data object, the computer-executable program code instructions may include further program code instructions for supplying the proximate data object to a predictive model in order to improve subsequent determinations of improved data objects.

In other embodiments, the implicit locations database may include implicit locations data gathered via one or more previous requests for a renderable data object by the location source device.

In some embodiments, the implicit locations data and the explicit locations data are grouped via a clustering method. In such an embodiment, the implicit locations data may be further grouped via a modified k-means clustering method, where the location data associated with requests for a renderable data object by the location source device having a lower time stamp are ranked higher relative other implicit locations data.

An apparatus comprising at least one processor and at least one memory including computer program code, the at least one memory is provided. The computer program code may be configured to, with the processor, cause the apparatus to receive a request for a renderable data object from a location source device associated with a user profile and receive instant location data associated with the location source device. The computer program code may be configured to, with the processor, cause the apparatus to query an explicit locations database associated with the user profile to identify explicit locations data and generate an explicit locations data set based on the explicit locations data as well as query an implicit locations database associated with the user profile to identify implicit locations data and generate an implicit locations data set based on the implicit locations data and the instant location data of the location source device. The computer program code may be configured to, with the processor, cause the apparatus to corank the explicit locations data set and the implicit locations data set to generate a coranked locations data set including one or more coranked locations and query a renderable objects database to generate a set of one or more renderable data objects based upon the one or more coranked locations of the coranked locations data set where each of the one or more renderable data objects is associated with one or more object redemption locations. The computer program code may be configured to, with the processor, cause the apparatus to compare the one or more coranked locations of the coranked locations data set with each of the one or more object redemption locations of each of the one or more renderable data objects to determine a proximity score for each of the renderable data objects with respect to each of the one or more coranked locations and rank each of the one or more renderable data objects based upon proximity score to generate a proximate object set. The computer program code may further be configured to, with the processor, cause the apparatus to identify a proximate data object, where the proximate data object of the proximate object set comprises the renderable data object having a minimum proximity score and transmit the proximate data object to the location source device.

In some embodiments, the coranking of the explicit locations data set and the implicit locations data set may also including comparing the explicit locations data set with the implicit locations data set to determine one or more verified locations in an instance in which the explicit locations data and the implicit locations data satisfy a proximity threshold. The computer program code may further be configured to, with the processor, cause the apparatus to generate the coranked locations data set by first ranking the one or more verified locations, second ranking the implicit locations data that does not satisfy the proximity threshold, and third ranking the explicit locations data that does not satisfy the proximity threshold.

In some cases, the explicit locations data of the explicit locations database may include location data corresponding to one or more of the billing address, the shipping address, and/or the social media of the user profile associated with the location source device.

In some other cases, upon identifying a proximate data object, the computer program code may further be configured to, with the processor, cause the apparatus to supply the proximate data object to a predictive model in order to improve subsequent determinations of improved data objects.

In other embodiments, the implicit locations database may include implicit locations data gathered via one or more previous requests for a renderable data object by the location source device.

In some embodiments, the implicit locations data and the explicit locations data are grouped via a clustering method. In such an embodiment, the implicit locations data may be further grouped via a modified k-means clustering method, where the location data associated with requests for a renderable data object by the location source device having a lower time stamp are ranked higher relative other implicit locations data.

BRIEF DESCRIPTION OF THE DRAWINGS

Figure 1:
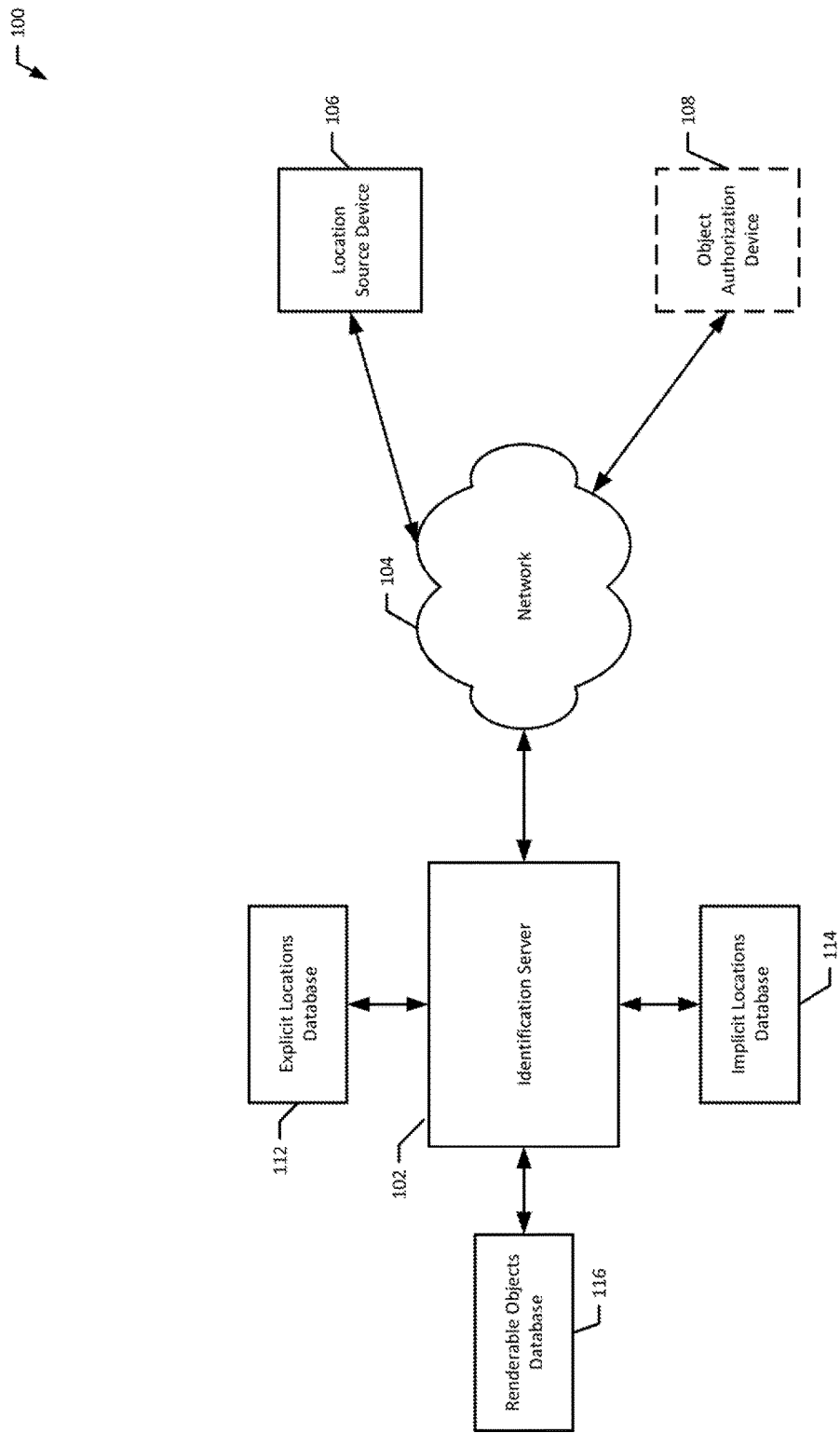
Figure 2:
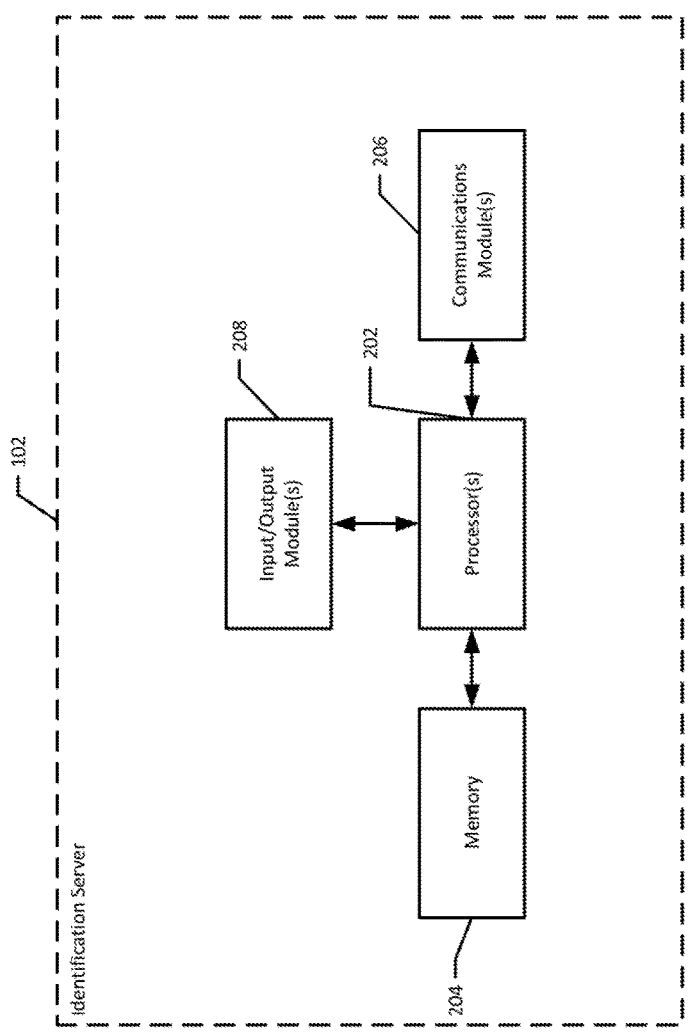
Figure 3:
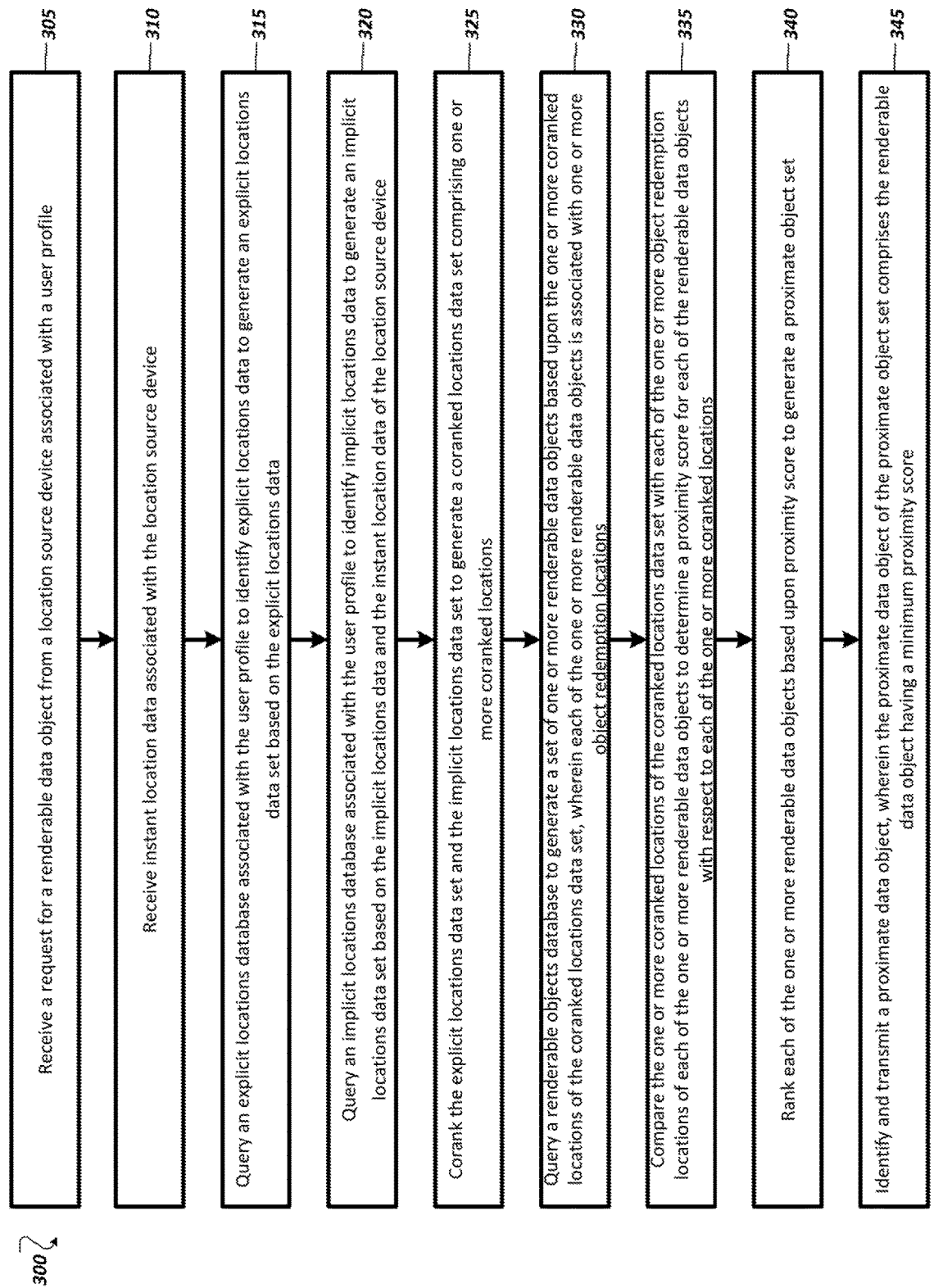
Figure 4:
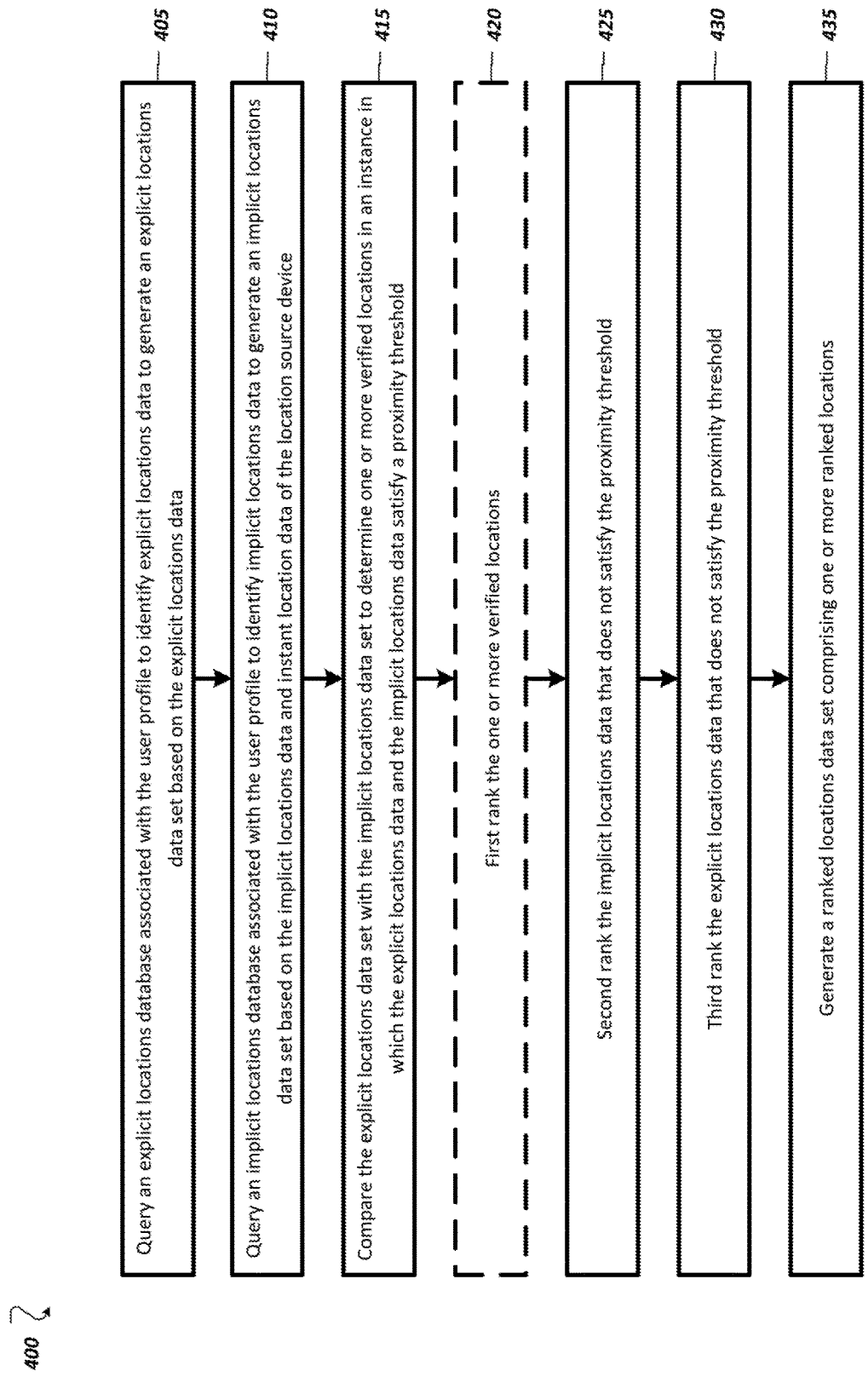
Figure 5:
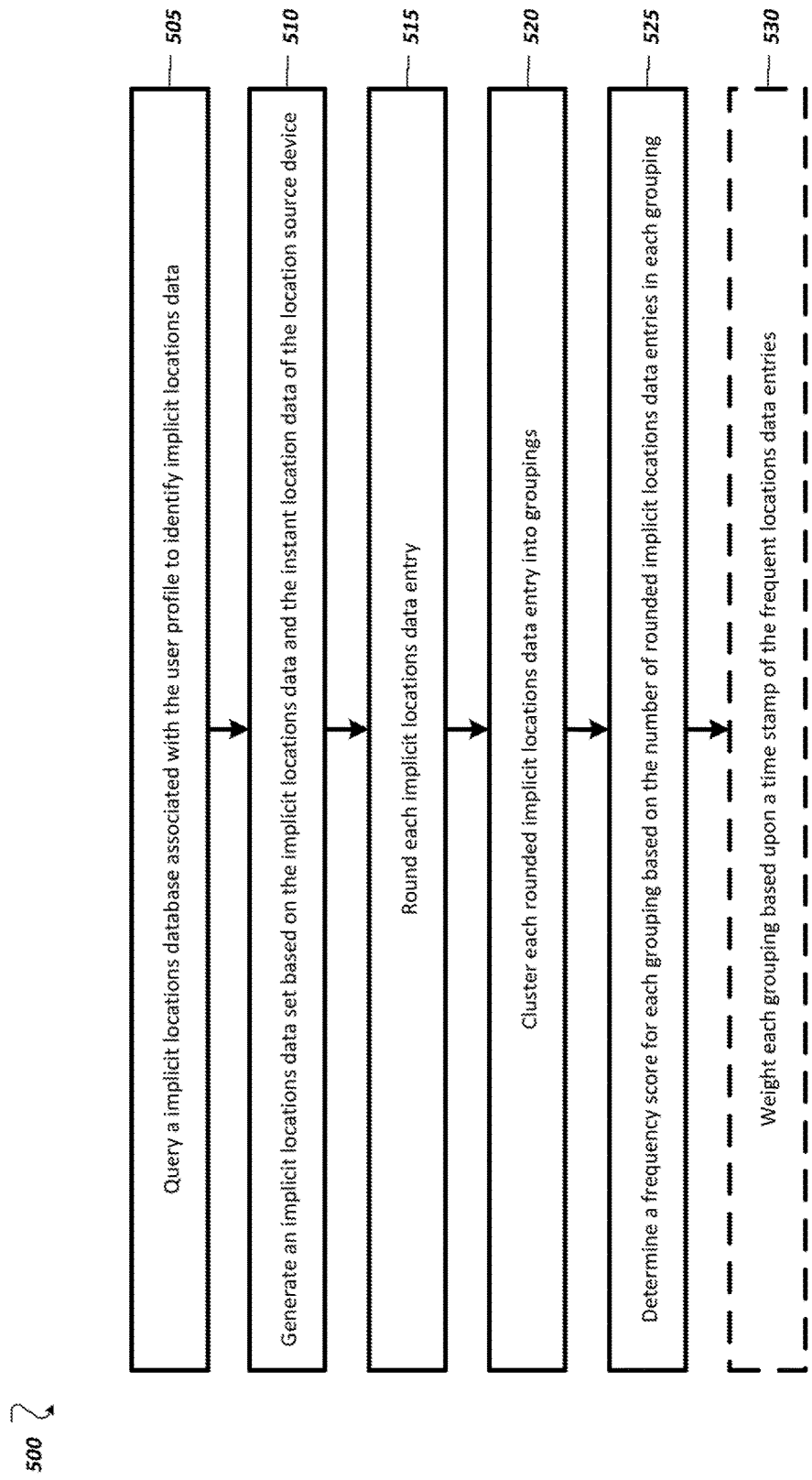
Figure 6:
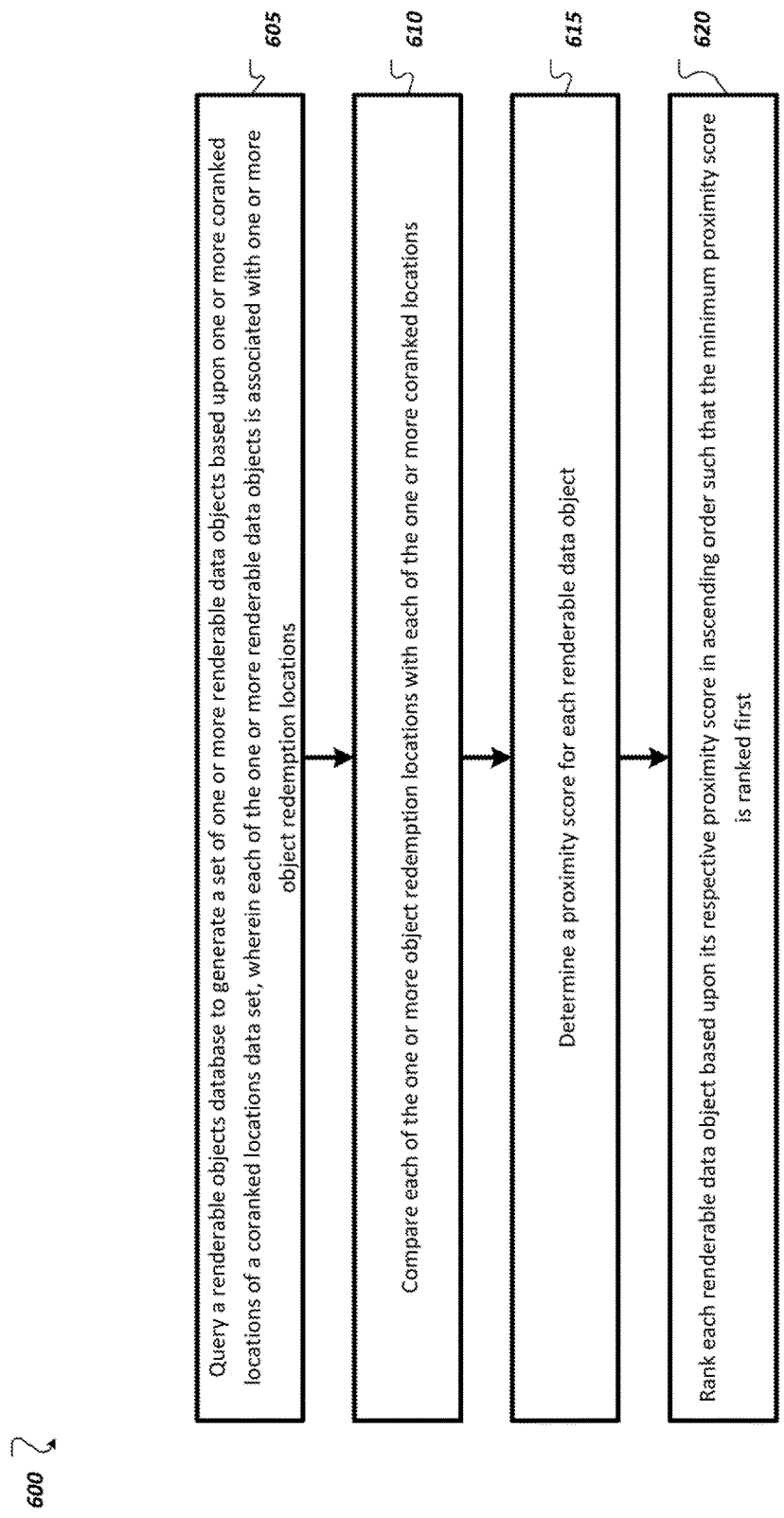
Figure 7:
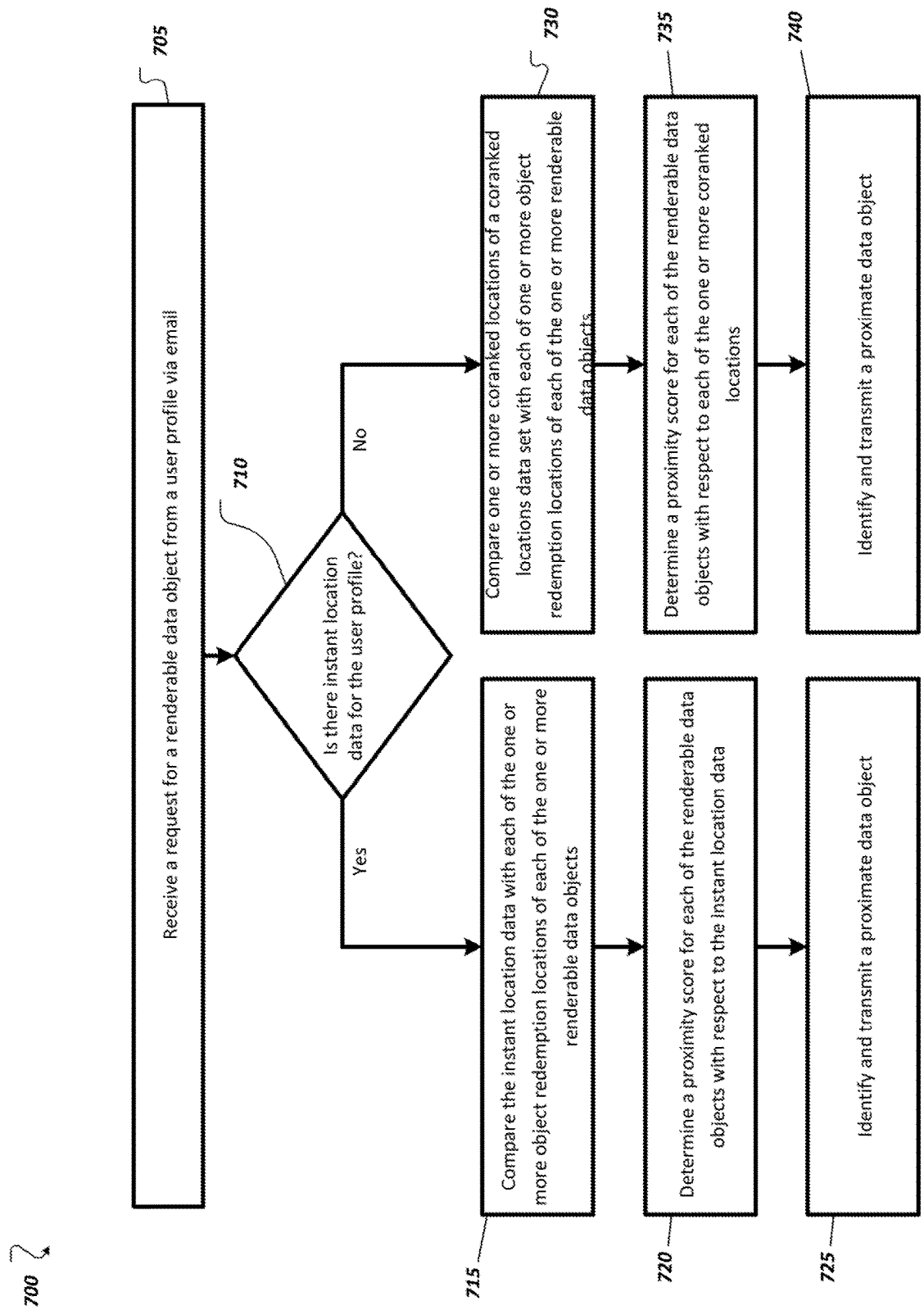
Figure 8:
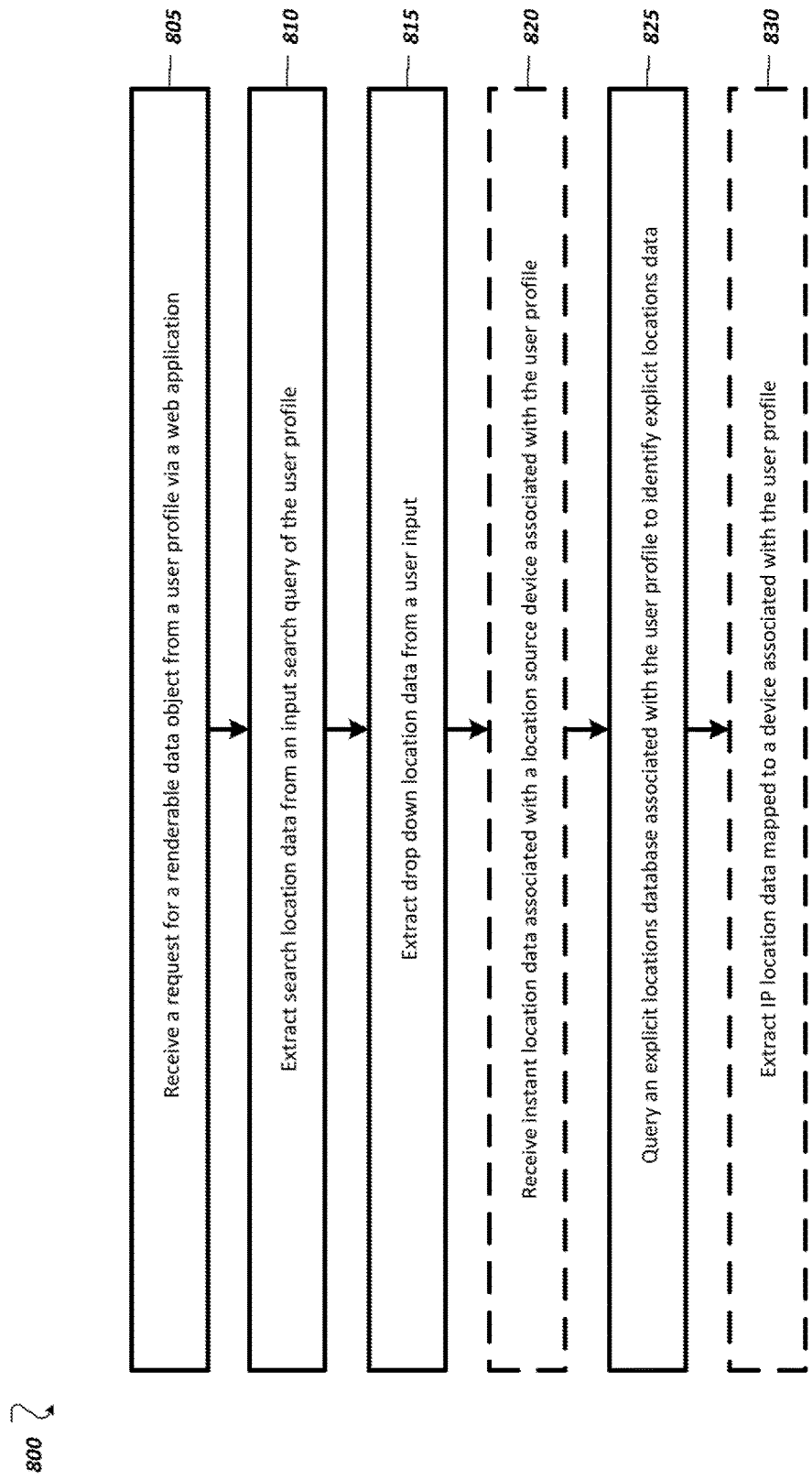

Having thus described certain example embodiments of the invention in general terms, reference will now be made to the accompanying drawings, which are not necessarily drawn to scale, and wherein:

FIG. 1 shows an example multi-source location system within which embodiments of the present invention may operate;

FIG. 2 shows a block diagram showing an example identification server for determining improved renderable data objects, using special-purpose circuitry in accordance with some exemplary embodiments of the present invention;

FIG. 3 shows a flowchart illustrating a method for determining improved renderable data objects by identifying a proximate data object, such as by the identification server of FIGS. 1-2, in accordance with an example embodiment of the present invention;

FIG. 4 shows a flowchart illustrating coranking explicit locations data and implicit locations data, such as by the identification server of FIGS. 1-2, in accordance with an example embodiment of the present invention;

FIG. 5 shows a flowchart illustrating clustering of implicit locations data, such as by the identification server of FIGS. 1-2, in accordance with an example embodiment of the present invention;

FIG. 6 shows a flowchart illustrating identifying a proximate data object, such as by the identification server of FIGS. 1-2, in accordance with an example embodiment of the present invention;

FIG. 7 shows a flowchart illustrating determining improved renderable data objects via email, such as by the identification server of FIGS. 1-2, in accordance with an example embodiment of the present invention; and FIG. 8 shows a flowchart illustrating determining improved renderable data objects via a web-based service, such as by the identification server of FIGS. 1-2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the description may refer to an "apparatus" or "identification server" performing and/or encompassing one or more of the elements described hereafter. However, elements and features of the apparatus or identification server described herein may be equally applicable to the claimed method and computer program product. Thus, use of any such terms should not be taken to limit the spirit and scope of embodiments of the present invention.

As described herein, system components can be communicatively coupled to one or more of each other. Though the components are described as being separate or distinct, two or more of the components may be combined into a single process or routine. The component functional descriptions provided herein including separation of responsibility for distinct functions by way of example. Other groupings or other divisions of functional responsibilities can be made as necessary or in accordance with design preferences. Similarly, various databases and/or the like may described herein as distinct. However, the present disclosure contemplates that these databases may equally be separate data sets hosted in a single database.

Definition of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device, or may be received indirectly via one or more intermediary computing devices, such as, for example, one or more identification servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, by one or more servers, relays, routers, network access points, base stations, hosts, and/or the like.

The term "identification server" may refer to a computing service or system that is accessible via one or more computing devices, mobile devices, location source devices, object authorization devices, or the like and that is operable to receive location data provided from multiple sources in order to determine a proximate data object by performing clustering, co-ranking, and other related methods (e.g., procedures, algorithm, or the like) on the received location data. In some example embodiments, the identification server may take the form of a central server disposed in communication with one or more additional servers and modules running software applications and having access to one or more databases storing location data, renderable data objects, application related data, and/or the like. In some example embodiments, the identification server may receive location data from one or more computing devices (e.g., via a request for a renderable data object by a mobile device of a user) and may query one or more databases in communication with the identification server to identify location data (e.g., an explicit locations database and/or an implicit locations database defined herein). The identification server may perform various methods and comparisons of the location data, renderable data objects, and/or object redemption locations associated with the renderable data objects, defined hereafter, in order to identify a proximate data object for transmission to the computing device (e.g., the mobile device of the user). Said differently, the identification server may be configured to receive a request for a renderable data object by a location source device (e.g., a mobile device of a user) in communication with the identification server via a network. The identification server may, in some embodiments, query an explicit locations database, an implicit locations database, and a renderable objects database. The identification server may corank and/or cluster the location data received and compare the location data with one or more renderable data objects in order to determine a proximate data object corresponding to the renderable data object the identification server determines to be most relevant to the user. The proximate data object may be transmitted by the identification server to the location source device (e.g., the mobile device of the user).

As used herein, the term "renderable data object" may be used to refer, without limitation, to one or more data sets including instructions for rendering or otherwise presenting information to a user. In some embodiments, the one or more data sets may include terms of a contractual offer, promotional value, or the like for presentation to the user via an impression, defined hereafter, and may reflect an action that can be elected by a user to cause the performance of an action at one or more object redemption locations defined by the terms contained within the one or more data sets of the renderable data object. A renderable data object may also include a set of parameters associated with the action and/or an object authorization device, defined below, including but not limited to characteristics of the renderable data object, one or more requirements associated with the action, timing aspects associated with the renderable data object, a proximity score, such as a proximity score determined by the identification server, and an indication of an object redemption location.

As used herein, the term "user profile" may refer to a collection of preferences, settings, configurations, data, and information associated with a specific user. A profile refers therefore to the explicit digital representation of a user's identity and other data or information associated with the user. A user profile configured in accordance with the present invention is accessible by one or more of the software applications that are supported by the identification server and, thus, may include application-specific preferences, settings, configurations, data, and information. In some embodiments, a user profile can be used to store a description of characteristics of the user and/or of the user's location source device (e.g., mobile device), as well as credentials and preferences of the user. In still another embodiment, a user profile may include implicit locations data and/or explicit locations data reported by one or more location source devices that are associated with the user profile.

As used herein, the term "location source device" may refer to computer hardware and/or software that is configured to access a service made available by the identification server and, among various other functions, is configured to, directly or indirectly, provide location data to the identification server and/or parse and interpret renderable data objects received from the identification server. Example location source devices may include a mobile device, a smartphone, a tablet computer, a laptop computer, a wearable device, a user's access badge, and the like. In other embodiments, a location source device may include a "smart device" that is equipped with chip of other electronic device that is configured to communicate with the identification server via Bluetooth, NFC, Wi-Fi, 3G, 4G, 5G, RFID protocols, and the like. In one example, a location source device may include an object that is equipped with a Wi-Fi radio that is configured to communicate with a Wi-Fi access point that is disposed in network communication with the identification server so as to provide instant location data of the location source device (e.g., location data indicative of the current location of the location source device).

As used herein, the term "impression" may be used, without limitation, to refer to a communication, a display, or other perceived indication, such as an e-mail communication, web-based display, application alert, graphical user interface ("GUI"), other type of electronic interface or distribution channel and/or the like, for displaying one or more renderable data objects. For example, a location source device (e.g., a mobile device) associated with a user may receive a renderable data object from the identification server and may parse and interpret the data contained therein in order to display the renderable data object to the user as an impression.

As used herein, the term "object authorization device" may be used to refer, without limitation, to one or more computing devices of a provider, merchant, business owner, consigner, shopkeeper, tradesperson, vender, operator, entrepreneur, agent, dealer, organization or the like that is in the business of a providing a good, service, or experience to a user, facilitating the provision of a good, service or experience to a user and/or otherwise operating in the stream of commerce (e.g., via a renderable data object). For example, an object authorization device may refer to a device, a system of devices, or a module operable to process or communicate in relation to a payment, such as a point-of-sale ("POS") machine, a mobile payment processing system, a cellular phone, a laptop, any intermediary device that could communicate with a POS machine, or the like. An object authorization device may or may not communicate with one or more databases or servers. In some embodiments, such as in response to an action by a user presented with a renderable data object via an impression on a location source device, the object authorization device may be operable to provide, redeem, and/or authorize redemption of the terms contained within the one or more data sets of the renderable data object.

As used herein, the term "explicit locations database" refers to a structured data set, table, or repository for storing location data accessible by the identification server, where the location data is associated with various known or fixed locations points (e.g., defined via latitude and longitude) and/or determined by affirmative action by a user. For example, explicit locations data may include location data (e.g., longitude and latitude coordinates) provided by one or more user profiles and associated location source devices such as location coordinates of billing addresses, shipping addresses, work locations, home locations, and the like. Explicit locations data may further include location data provided by object authorization devices (e.g., POS machines, object redemption locations, distribution center locations, or the like), location data determined from one or more searches or aggregation of Internet data, and/or affirmative user actions to provide location data such as by scanning an RFID tag or a barcode label that is affixed to an object having fixed or otherwise known location data (e.g., a fixed latitude and longitude).

As used herein, the term "implicit locations database" refers to a structured data set, table, or repository for storing location data accessible by the identification server, where the location data is associated with various locations (e.g., defined via latitude and longitude) corresponding to or gathered from a location source device and associated user profile. Said differently, the implicit locations database may include implicit locations data that is gathered from one or more previous requests by a location source device for a renderable data object (e.g., global positioning system ("GPS") pings from a mobile device) and may include instant location data for the location source device (e.g., from a pending request for a renderable data object). In some example embodiments, the implicit locations database may include implicit locations data corresponding to latitude and longitude location data determined by the location source device (e.g., mobile device of the user) and transmitted to the identification server (e.g., via a software application of the like) as well as implicit locations data that may be derived or passively obtained from the location source device (e.g., NFC, Bluetooth, Wi-Fi, or the like). Said differently, the implicit locations database may include implicit locations data of an instant location of the location source device (e.g., mobile device of user profile) and/or implicit locations data that is suggestive of a location (e.g., GPS latitude and longitude) that does not require affirmative actions by the user in order to provide the location data (e.g., location data of one or more previous requests for a renderable data object).

As used herein, the term "renderable objects database" refers to a structured data set, table, or repository for storing renderable objects data accessible by the identification server, where the renderable objects data is associated with various renderable data objects. This renderable objects data may include information related to the timing, location, value, or the like for the renderable data object as defined above. In some embodiments, the renderable objects database may store one or more renderable data objects (e.g., able to be redeemed by a user profile) where each of the one or more renderable data objects is associated with one or more object redemption locations, defined by a corresponding object authorization device.

As used herein, the term "coranked locations data set" refers to a group of location data identified from one or more database queries (e.g., explicit locations database and/or implicit locations database), where the group of location data has been filtered, reduced, enhanced, or improved by comparison of the explicit locations data and implicit locations data described herein. In this regard, the coranked locations data set may represent a subset or modified version of the explicit locations data set of the explicit locations database and/or of the implicit locations data set of the implicit locations database. In some embodiments, the coranked locations data set may refer to a particular order of location data entries where each location data entry is ordered, grouped, or ranked based upon a coranking method, algorithm, procedure, or the like. By way of example, the identification server may query the explicit locations database and/or the implicit locations database to identify location data for the user profile and associated location source device including instant location data, explicit locations data, and/or implicit locations data. The identification sever may corank all or any portion of this location data in order to form a coranked locations data set indicative of the locations most frequent to the user profile and associated location source device.

As used herein, the term "proximate object set" refers to a group of renderable data objects generated from one or more queries, where the group of renderable data objects has been filtered, reduced, enhanced, or improved by comparison between one or more object redemption locations associated with each renderable data object and each of the one or more coranked locations of the coranked locations data set defined above. In this regard, the proximate object set may represent a subset or modified version of the renderable data objects of the renderable objects database. In some embodiments, the proximate object set may refer to a particular order of renderable data objects based upon a proximity score defined below.

As used herein, the term "proximity score" refers to a defined mathematical difference between location data entries (e.g., a latitude and a longitude). In particular, the proximity score may refer to the mathematical difference between one or more coranked locations of the coranked locations data set described above and one or more object redemption locations associated with one or more renderable data objects. In some embodiments, the proximity score may refer to a defined mathematical difference between an array of location coordinates (e.g., array of location data defining a park or building), and location coordinates associated with a location source device. In some other embodiments, the proximity score may refer to a defined mathematical difference between the average location data associated with two locations. By way of example, a location source device may iteratively transmit instant location data associated with its current positioning (e.g., mobile device traveling along a route) such that the mathematical representation of the distance between the location source device and an object redemption location varies. In such an embodiment, the proximity score may refer to the difference between the average location coordinate for the location source device and the location data for the object redemption location.

As used herein, the term "application program" refers to computer-executable application software programmed to or capable of running on a processing unit of a computing device. Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Overview

Many particularly advantageous implementations of embodiments of the invention arise in contexts and situations that involve the transmission and presentation to a user of a mobile device (e.g., location source device) of renderable data objects that are in the form of deal offers (e.g., such as offers to purchase goods, services, and/or other resources at a discounted price). In many such example implementations, these renderable data objects are associated with one or more particular geographic locations, such as a restaurant, retailer, service provider, or other object redemption location. Similarly, the terms contained within the one or more data sets and instructions of the renderable data object may require that a user physically travel to an object redemption location in order to redeem the terms of the renderable data object. One of the technical and business related challenges in such contexts involves the transmission and presentation of renderable data objects that are associated with object redemption locations that are inconvenient to a user due to the large distance between the current or frequent locations of the user and the object redemption location(s).

This technical challenge is often driven by the inability of predictive modeling (e.g., using machine learning models) to take into account not only the current location of a user, but the frequent locations of a user. For example, a user may primarily work in Silicon Valley and may most frequently request renderable data objects at this location, but may also have a residential address in Oakland. While the user may request renderable data objects while located in Silicon Valley, renderable data objects near Oakland may also be convenient to the user. Traditional models may utilize the current location of the user via a GPS signal from a user's mobile device requesting a renderable data object as the basis for suggesting renderable data objects. Said differently, traditional models may only suggest renderable data objects near Silicon Valley while renderable data objects near Oakland may be preferable to the user due to the user being frequently located in Oakland.

Another factor that tends to contribute to this issue arises with a predictive model that is unable to receive a current or instant location of a user. Such models may primarily rely upon a current location or recent location of a user or user's mobile device (e.g., location source device) to drive determining a renderable data object for transmission to the user. However, in some instances, a user's current location may be unavailable to the model such as in large cities when line of sight (LOS) to GPS satellites is precluded. Consequently, such models are unable to recognize that users possess an inherent willingness to travel (e.g., acceptable geographic area) that is often dependent upon the locations where the user is most frequently located.

To solve and address these issues, example implementations of embodiments of the invention corank explicit locations data representative of various known or fixed locations points of a user such as location coordinates of billing addresses, shipping addresses, work locations, home locations, and the like, and implicit locations that may be derived or passively obtained from the location source device (e.g., mobile device) such as via NFC, Bluetooth, Wi-Fi, GPS or the like. The example implementations of the embodiments of the invention compare the coranked location data and one or more object redemption locations to determine renderable data objects having one or more object redemption location that are proximate the frequent locations of the user (e.g., the explicit and implicit locations). In doing so, such example implementations confront and solve at least three technical challenges: (1) reliably detecting the frequent locations of the user, (2) ascertaining the object redemptions locations convenient to the frequent locations of the user, and (3) modeling the propensity of users in general to travel for a specific renderable data object depending upon the relative distance of the object redemption location of said renderable data object (e.g., determining distance-based conversion rates).

System Architecture

With reference to FIG. 1, an example multi-source location system 100 is illustrated with an identification server 102 communicably connected with a location source device 106 and an object authorization device 108 via a network 104. The example multi-source location system 100 may also include a renderable objects database 116, implicit locations database 114, and an explicit locations database 112 in communication with the identification server 102.

The identification server 102 may include circuitry, networked processors, or the like configured to perform some or all of the identification server-based processes described herein, and may be any suitable network identification server and/or other type of processing device. In some embodiments, the identification server 102 may function as a "cloud" with respect to the location source device 106. In that sense, the identification server 102 may include several servers performing interconnected and/or distributed functions. To avoid unnecessarily overcomplicating the disclosure, the identification server 102 is shown and described herein as a single server.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The location source device 106 may be associated with a user and/or user profile. Although a single location source device 106 is shown, the multi-source location system 100 may include any number of location source devices that may be associated with various other users and/or user profiles. As defined above, the location source device 106 may be a cellular telephone (including smartphones and/or other types of mobile telephones), laptop, tablet, electronic reader, e-book device, media device, wearable, or any combination of the above.

In some embodiments, an object authorization device 108 may be also be communicably connected with the identification server 102. In such an embodiment, the object authorization device 108 may be a cellular telephone (including smartphones and/or other types of mobile telephones), laptop, tablet, electronic reader, e-book device, media device, wearable, or any combination of the above. Furthermore, the object authorization device 108 may operate to transmit renderable data objects to the identification server 102. In some embodiments, the object authorization device 108 may input one or more renderable data objects into a memory (e.g., renderable objects database 116) accessible by the identification server 102 of the multi-source location system 100. Although shown as a single object authorization device 108, the multi-source location system 100 may include any number of object authorization devices 108.

In some embodiments, the location source device 106 may be configured to request a renderable data object for display (e.g., as an impression) on the location source device 106. The location source device 106 may also allow a user to input commands (such as selecting a particular renderable data object) which may be conveyed to the identification server 102 via the network 104 or to the object authorization device 108 for redemption. This conveyance may be transmitted as input data generated via one or more input devices including, without limitation, a touchscreen, a microphone, a camera, and/or a motion sensor device (e.g., an accelerometer, gyroscope, etc.).

The renderable objects database 116 may be any suitable network storage device configured to store some or all of the information described herein. The renderable objects database 116 may receive renderable object data from the identification server 102 (e.g., via a memory 204 and/or processor(s) 202), and may store this renderable object data. As such, the renderable objects database 116 may include, for example, one or more database systems, backend data servers, network databases, cloud storage devices, etc. To avoid unnecessarily overcomplicating the disclosure, the renderable objects database 116 is shown and described herein as a single database.

The implicit locations database 114 may be any suitable network storage device configured to store some or all of the information described herein. The implicit locations database 114 may receive location data from the identification server 102 (e.g., via a memory 204 and/or processor(s) 202), and may store this location data as implicit locations data. As such, the implicit locations database 114 may include, for example, one or more database systems, backend data servers, network databases, cloud storage devices, etc. To avoid unnecessarily overcomplicating the disclosure, the implicit locations database 114 is shown and described herein as a single database.

The explicit locations database 112 may be any suitable network storage device configured to store some or all of the information described herein. The explicit locations database 112 may receive location data from the identification server 102 (e.g., via a memory 204 and/or processor(s) 202), and may store this data as explicit locations data. As such, the explicit locations database 112 may include, for example, one or more database systems, backend data servers, network databases, cloud storage devices, etc. To avoid unnecessarily overcomplicating the disclosure, the explicit locations database 112 is shown and described herein as a single database. Although described herein as three (3) separate, distinct databases, the data of the explicit locations database 112, the implicit locations database 114, and/or the renderable objects database 116 may equally be stored as three (3) separate data sets hosted by a single database.

Example Apparatus for Implementing

Embodiments of the Present Invention

FIG. 2 shows a schematic block diagram of an example circuitry 200, some or all of which may be included in the identification server 102 or the location source device 106. In accordance with some example embodiments, circuitry 200 may include various means, such as one or more processors 202, memory(s) 204, communications modules 206, input/output modules 208. The means of circuitry 200 as described herein may be embodied as, for example, circuitry, hardware elements (e.g., a suitably programmed processor, combinational logic circuit, integrated circuit, or the like), a computer program product comprising computer-readable program instructions stored on a non-transitory computer-readable medium (e.g., memory 204) that is executable by a suitably configured processing device (e.g., processor 202), or some combination thereof.

The processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 202 may comprise a plurality of processing means. The plurality of processing means may be embodied on a single computing device or may be distributed across a plurality of computing devices collectively configured to function as the circuitry 200. The plurality of processing means may be in operative communication with each other and may be collectively configured to perform one or more functionalities of the circuitry 200 as described herein. In an example embodiment, the processor 202 may be configured to execute instructions stored in the memory 204 or otherwise accessible to the processor 202. These instructions, when executed by the processor 202, may cause the circuitry 200 to perform one or more of the functionalities described herein.

Whether configured by hardware, firmware/software methods, or by a combination thereof, the processor 202 may comprise an entity capable of performing operations according to embodiments discussed herein while configured accordingly. Thus, for example, when the processor 202 is embodied as an ASIC, FPGA or the like, the processor 202 may comprise specifically configured hardware for conducting one or more operations described herein. As another example, when the processor 202 may be embodied as an executor of instructions, such as may be stored in the memory 204, the instructions may specifically configure the processor 202 to perform one or more algorithms, methods, or operations described herein. For example, the processor 202 may be configured to execute operating system applications, firmware applications, media playback applications, media editing applications, among others.

The memory 204 may comprise, for example, volatile memory, non-volatile memory, or some combination thereof. Although illustrated in FIG. 2 as a single memory, the memory 204 may comprise a plurality of memory components. The plurality of memory components may be embodied on a single computing component or distributed across a plurality of computing components. In various embodiments, the memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, or some combination thereof. The memory 204 may be configured to store information, data, applications, instructions, or the like for enabling the circuitry 200 to carry out various functions in accordance with example embodiments discussed herein. For example, in at least some embodiments, the memory 204 may be configured to buffer input data for processing by the processor 202. Additionally or alternatively, in at least some embodiments, the memory 204 may be configured to store program instructions for execution by the processor 202 and/or data for processing by the processor 202. The memory 204 may store information in the form of static and/or dynamic information. This stored information may be stored and/or used by the circuitry 200 during the course of performing its functionalities.

The communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry, component, server, module, or the like. In some embodiments, the communications module 206 (like other components discussed herein) can be at least partially embodied as or otherwise controlled by the processor 202. In this regard, the communications module 206 may be in communication with the processor 202, such as via a bus. The communications module 206 may include, for example, an antenna, a transmitter, a receiver, a transceiver, network interface card and/or supporting hardware and/or firmware/software for enabling communications. The communications module 206 may be configured to receive and/or transmit any data that may be stored by memory 204 using any protocol that may be used for communications. The communications module 206 may additionally and/or alternatively be in communication with the memory 204, the input/output module 208, and/or any other component of the circuitry 200, such as via a bus. The communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, or 5.6 GHz communication systems), infrared, GSM, GSM plus EDGE, CDMA, quad-band, and other cellular protocols, VOIP, or any other suitable protocol.

The input/output module 208 may be in communication with the processor 202 to receive an indication of an input and/or to provide an audible, visual, mechanical, or other output. In that sense, the input/output module 208 may include means for performing analog-to-digital and/or digital-to-analog data conversions. The input/output module 208 may include support, for example, for a display, touch-screen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. In embodiments where the circuitry 200 may be implemented as an identification server 102, as shown in FIG. 2, aspects of the input/output module 208 may be reduced as compared to embodiments where circuitry 200 may be implemented as an end-user machine or other type of device designed for complex user interactions (i.e., location source device 106). In some embodiments (like other components discussed herein), the input/output module 208 may even be eliminated from the circuitry 200. Alternatively, such as in embodiments wherein the circuitry 200 is embodied as an identification server, at least some aspects of the input/output module 208 may be embodied on an apparatus used by a user that is in communication with the circuitry 200. The input/output module 208 may be in communication with the memory 204, the communications module 206, or any other component(s), such as via a bus. Although more than one input/output module and/or other component can be included in the circuitry 200, only one is shown in FIG. 2 to avoid overcomplicating the disclosure (e.g., like the other components discussed herein).

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, identification servers, databases, systems, and the like. Accordingly, embodiments may include various means comprised entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, magnetic storage devices, etc.

Embodiments have been described above with reference to block diagrams of components, such as functional modules, system components, and circuitry. Below is a discussion of example process flowcharts describing functionality that may be implemented by one or more components discussed above. Each block of the block diagrams and process flowcharts, and combinations of block diagrams and process flowcharts, respectively, can be implemented by various means including computer program instructions. These computer program instructions may be loaded onto a general purpose computer, special purpose computer, or other programmable data processing apparatus, such as the processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Improved Renderable Data Objects

The method, apparatus (e.g., identification server 102), and computer program product of an example embodiment will now be described in conjunction with the operations illustrated in FIGS. 3-8. With reference to FIG. 3, a flowchart is provided that illustrates a method 300 completed by the identification server 102 for determining improved renderable data objects for use with some embodiments described herein. The apparatus (e.g., identification server 102 in FIG. 1) may receive a request for a renderable data object from a location source device associated with a user profile at Block 305 and may receive instant location data associated with the location source device at Block 310. The instant location data may be generated by the location source device using Global Positioning Satellite ("GPS") technologies. Alternatively or additionally, in some embodiments, location data may be generated by detection of a LAN or access point (e.g., Bluetooth or Wi-Fi technologies) or by reading a tag having a known location (e.g., Radio-frequency identification ("RFID"), QR code, or barcode technologies) using a location source device coupled reader or scanner. The apparatus may, in some embodiments, receive a request from a location source device at Block 305 by manual request from a user associated with the location source device. In such an embodiment, the user may input a request (via text, voice, etc.) at their location source device (e.g., via an application), which may convey the request for a renderable data object to the identification server 102.

In other embodiments, the apparatus may receive a request for a renderable data object at Block 305 without input from a user. In such an embodiment, the location source device may automatically request a renderable data object based upon the opening of an associated application program of the location source device. The location source device may be further configured to frequently request a renderable data object and transmit instant location data (e.g., periodically pushing location data determined based on the GPS, Wi-Fi, Bluetooth, etc.). By way of example, a location source device may be traveling along a route such that the instant location data associated with the location source device changes. In such an example, the location source device may periodically request one or more renderable data objects based upon the change in the instant location data (e.g., moving outside of the range of one or more renderable data objects and/or associated object redemption locations).

Once the instant location data associated with the location source device has been received at Block 310, the identification server 102 may include means, such as the processor 202, the communication modules(s) 206, or the like, for querying an explicit locations database 112 associated with the user profile to identify explicit locations data to generate an explicit locations data set based on the explicit locations data at Block 315. As defined above, the explicit locations database 112 may include explicit locations data that relates to known or otherwise stored fixed locations (e.g., a latitude and a longitude) such as a user profile's billing address, shipping address, work address, and the like. The explicit locations data may further be manually inputted by a user to the user's profile (e.g., and later extracted by the identification server 102) or, depending upon various user permissions, may be automatically extracted from the user's profile via an offline hive query. While the location coordinates for each explicit locations data entry may change (e.g., movement of a billing address), the explicit locations data associated with the location coordinate is fixed until manually updated by a user or a user's profile.

The identification server 102 may also include means, such as the processor 202, the communication modules(s) 206, or the like, for querying an implicit locations database 114 associated with the user profile to identify implicit locations data to generate an implicit locations data set based on the implicit locations data and the instant location data of the location source device at Block 320. As defined above, the implicit locations database 114 may include implicit locations data that relates to one or more previous requests by the location source device for a renderable data object (e.g., global positioning system ("GPS") pings from the mobile device) and may include the instant location data (e.g., from a pending request for a renderable data object) of the location source device. As described and defined above, the implicit locations data may correspond to location coordinates corresponding to where the user most frequently is located. By way of example, the location source device associated with the user may request one or more renderable data objects at work, home, stores, and the like. The identification server 102 may receive instant location data of the location source device at each request for a renderable data object and may store the locations coordinates of the location source device as implicit locations data. As described below with reference to FIG. 5, the identification server 102 may employ a clustering method to the group the implicit locations data. For example, a location source device may frequently request a renderable data object when located in a shopping mall. However, the location of each request within the shopping mall may be associated with a different location coordinate (such as request from different stores at a shopping mall having a large geographic area). The clustering method of FIG. 5 may operate to appropriately group these requests to the same location data coordinate in order to more accurately determine proximate data objects.

Following generation of the explicit locations data set and the implicit locations data set at Blocks 315, 320, the identification server 102 may also include means, such as the processor 202, the communication modules(s) 206, or the like, for coranking the explicit locations data set and the implicit locations data set to generate a coranked locations data set comprising one or more coranked locations at Block 325. Described more fully with reference to FIG. 4 below, the coranked locations data set may order or otherwise rank the explicit locations data and the implicit locations data into a single data set for use in determining a proximity score described hereafter. Said differently, the coranked locations data set may serve to represent the most frequent locations of the user (e.g., via the coranking of the explicit locations data and implicit locations data) to be used in determining a proximity score (e.g., described hereafter) in order to define a particular user profile's willingness to travel to redeem one or more terms within one or more data sets of the renderable data object.

The identification server 102 may also include means, such as the processor 202, the communication modules(s) 206, or the like, for querying a renderable object database 116 to generate a set of one or more renderable data objects based upon the one or more coranked locations of the coranked locations data set, wherein each of the one or more renderable data objects is associated with one or more object redemption locations at Block 330. As defined above, the renderable objects database 116 refers to a repository storing renderable data objects accessible by the identification server 102. The renderable data object may include one or more data sets and/or instructions associated with various terms, offers, promotions, deals, or the like. The locations sever 102 may query the renderable objects database 116 at Block 330 to determine renderable data objects available in a geographic location relative the instant location data of the location source device. In some embodiments, in an instance in which the location source device requests a renderable data object, the instant location data of the location source device may be used by the identification server 102 to determine renderable data objects within a geographic area relative the instant location data. The size of this geographic area may be set as a system parameter or may be adjustable depending upon the instant location data of the location source device. By way of example, the geographic area corresponding to a location source device in New York City may be smaller than the geographic area of a rural, sparsely populated location. Said differently, users located in densely populated, urban environments may have to travel a smaller distance to find object redemption locations than users located in rural, sparsely populated environments.

In some other embodiments, such as those when instant location data is unavailable for the location source device (e.g., poor line of sight ("LOS") to GPS satellites or renderable data objects requested via email), the identification server 102 may use other locations as the central coordinate for determining the geographic area. For example, in an instance in which a user is subscribed to an email newsletter, the identification server 102 may determine the IP address of a user device or may request a location of the user for use as an epicenter of the geographic area. Similarly, in an instance in which instant location data is unavailable due to poor LOS, the identification server 102 may utilize one or more of the implicit locations data coordinates, described herein, as the epicenter of the geographic area.

The renderable objects database 116 may also store one or more object redemption locations associated with each of the one or more renderable data objects. In some embodiments, these object redemption locations are defined by a provider (e.g., object authorization device 108) of the renderable data object. By way of example, an object authorization device 108 may offer a renderable data object (e.g., a promotion) that may be redeemed at three (3) object redemption locations within a geographic region relative the location source device. As described below, each of these object redemption locations may be considered by the identification server 102 in determining which renderable data object to transmit to the location source device (e.g. the proximate data object).

The identification server 102 may also include means, such as the processor 202, the communication modules(s) 206, or the like, for comparing the one or more coranked locations data of the coranked locations data set with each of the one or more object redemption locations of each of the one or more renderable data objects to determine a proximity score for each of the renderable data objects with respect to each of the one or more coranked locations at Block 335. As described below with reference to FIG. 6, the identification server 102 may employ a proximity method to determine a proximity score for each of the renderable data objects. In particular, the identification server 102 may compare the location data for each object redemption location with each coranked locations data entry to determine a proximity score (e.g., effective distance between) for each renderable data object. By way of continued example, the identification server 102 may compare the geographic location of each of the object authorization device's three (3) object redemption locations to each of the one or more coranked locations (e.g., office, home, grocery store, etc.). The proximity score may then represent the minimum distance between each of the three (3) object redemption locations to each of the most frequent locations of the user and associated location source device. Said differently, the proximity score may function to describe a user's willingness to travel to an object redemption location in that the object redemption locations that have a lower proximity score may represent object redemption locations that are convenient (e.g., closest to a user's frequent locations) to the user or user profile. Still further, given that the one or more coranked locations represent the most frequent locations of the user profile (e.g., via the coranking of the explicit locations data and implicit locations data), the proximity score considers both fixed locations and mobile locations of a user in determining that particular user profile's willingness to travel.

Once a proximity score for each renderable data object with respect to each coranked location is determined at Block 335, the identification server 102 may also include means, such as the processor 202, the communication modules(s) 206, or the like, for ranking each of the one or more renderable data objects based upon proximity score to generate a proximate object set at Block 340. In some embodiments, the identification server 102 may rank the renderable data objects in ascending order (e.g., lowest proximity score ranked first to highest proximity score ranked last) to generate a proximate object set. In such an embodiment, the renderable data objects with at least one object redemption location closest (e.g., via comparison of geographic location coordinates at Block 335) to at least one coranked location (e.g., a user's most frequent locations) would be ranked first. In some other embodiments, the identification server 102 may employ weighted parameters such that each object redemption location and/or each ranked location is differently weighted. By way of example, the identification server 102 may determine that object redemption locations in geographical areas with higher crime rates should be weighted lower than object redemption locations in geographic areas with lower crime rates. Similarly, the identification server 102 may weight ranked locations based upon the frequency in which the user is located at said ranked location. By way of example, in an instance in which a user who is employed at a grocery store, hotel, or similar location that may coincide with an object redemption location, requests a renderable data object, the identification server may instead provide a renderable data object with a redemption location nearer their home (e.g., for convenience traveling to and from work, to avoid redeeming an offer at work, etc.) even though the geographic location of their employment location is ranked higher (e.g., having a lower proximity score).

Once the one or more renderable data objects are ranked based upon proximity score at Block 340, the identification server 102 may also include means, such as the processor 202, the communication modules(s) 206, or the like, for identifying and transmitting a proximate data object, wherein the proximate data object of the proximate object set comprises the renderable data object having a minimum proximity score at Block 345. As described above, the identification server 102 may identify, based upon the preceding determinations, a proximate data object having a minimum proximity score (e.g., the lowest effective geographical distance between). The identification server 102 may then transmit the proximate data object to the location source device associated with the user profile. As described above, in an instance in which a location source device is not present (e.g., via an email newsletter, subscription, web server, or the like), the proximate data object may be transmitted to a separate device or account of the user profile (e.g., via email, text message, etc.).

In some embodiments, the proximate data object identified by the identification server 102 at Block 345 may further be stored by the identification server 102 (e.g., via the memory 204 or the like) to be used in the generation and/or modification of one or more predictive models (e.g., machine learning models). In particular, the methods described herein may be performed by the identification server 102 in order to identify a proximate data object requested by various location source devices each associated with a user profile. The proximate data objects identified by these methods for each of the location source devices and associated user profiles may then be used by a predicative model to improve subsequent determinations of proximate data object for users in general. By way of example, a predictive model may utilize proximate data objects determined and stored by the method 300 in order to estimate a conversion rate associated with each renderable data object (e.g., via the terms defined by each renderable data object) based upon the distance between the location source device and the one or more object redemption locations associated with the terms of each renderable data object (e.g., 5% conversion rate for object redemption locations within 1 mile of the location source device, 1% conversion rate object redemption locations between 1-2 miles of the location source device, etc.).

With reference to FIG. 4, a method 400 is illustrated for coranking explicit locations data and implicit locations data. The identification server 102 may include means, such as the processor 202, the communication modules(s) 206, or the like, for querying an explicit locations database associated with the user profile to identify explicit locations data to generate an explicit locations data set based on the explicit locations data at Block 405. Similarly, the identification server 102 may include means, such as the processor 202, the communication modules(s) 206, or the like, for querying an implicit locations database associated with the user profile to identify implicit locations data to generate an implicit locations data set based on the implicit locations data and the instant location data of the location source device at Block 410. As described above in reference to FIG. 3, the identification server 102 may be in communication with various databases including an explicit locations database 112 and an implicit locations database 114 (see FIG. 1). The identification server 102 may receive from a query to these databases an explicit locations data set and an implicit locations data set, wherein the implicit locations data set further includes the instant location data of the location source device.

The identification server 102 may then include means, such as the processor 202, the communication modules(s) 206, or the like, for comparing the explicit locations data set with the implicit locations data set to determine one or more verified locations in an instance in which the explicit locations data and the implicit locations data satisfy a proximity threshold at Block 415. By way of example, the identification server 102 may receive explicit locations data (e.g., geographic location coordinates) representative of fixed locations provided by the user profile (e.g., billing address, shipping address, etc.). The identification server 102 may also receive implicit locations data (e.g., geographic location coordinates) representative of the instant location of the location source device as well as the geographic location of previous requests for a renderable data object (e.g., via GPS pings or the like). In order to determine one or more verified locations at Block 415, the identification server 102 may compare each of these location coordinates to determine if one or more of the implicit locations data entries satisfies a proximity threshold. By way of example, a proximity threshold may define a one (1) mile geographic radius located at the location coordinates of each explicit locations data entry (e.g., geographic coordinates). The identification server 102 may compare, for example, various previous requests from the location source device for a renderable data object (e.g., implicit locations data) with the proximity threshold to determine if the geographic locations of these implicit locations data coordinates satisfies the proximity threshold. Said differently, the identification server 102 may determine if the geographic locations of each of the implicit locations data entries are located within the one (1) mile perimeter. For every instance in which the frequent location satisfies the proximity threshold defined by the one or more explicit locations data entries, the identification server may determine one or more locations.

As would be understood by one of ordinary skill in the art in light of the present disclosure, the use of verified locations may improve determinations of renderable data objects that are proximate the location source device or frequent locations (e.g., coranked locations data) of the location source device. The use of verified locations in the coranking method 400 allows for the identification server 102 to more accurately determine the geographic locations where the user is frequently located so as to provide renderable data objects proximate these verified locations.

Accordingly, the identification server 102 may then include means, such as the processor 202, the communication modules(s) 206, or the like, for generating a coranked locations data set comprising one or more coranked locations at Block 435. As illustrated in FIG. 4, the identification server 102 may first rank the one or more verified locations at Block 420, may second rank the implicit locations data that does not satisfy the proximity threshold at Block 425, and may third rank explicit locations data that does not satisfy the proximity threshold at Block 430. While the identification server 102 may first rank the one or more verified locations for the reasons discussed above, the identification server may second rank frequent location that does not satisfy the proximity threshold at Block 425. By way of example, in an instance in which no verified locations are determined at Block 415, the identification server 102 may rank implicit locations data (e.g., GPS pings from the mobile device, previous and instant) above explicit locations data (e.g., billing addresses, shipping addresses, and the like). Given that the implicit locations data corresponds to received locations data from the location source device as opposed to user inputted data (e.g., extracted from a user's profile), the identification server 102 may determine that the implicit locations data is a more accurate representation of the location of the user profile and associated location source device.

With reference to FIG. 5, a method 500 is illustrated for clustering implicit locations data. The identification server 102 may include means, such as the processor 202, the communication modules(s) 206, or the like, for querying an implicit locations database associated with the user profile to identify implicit locations data at Block 505 and for generating an implicit locations data set based on the implicit locations data and the instant location data of the location source device at Block 510. As described above in reference to FIG. 3, the implicit locations data and associated implicit locations data set may correspond to the instant location data of the location source device in addition to the location data associated with one or more previous requests for a renderable data object by the location source device.

The identification server 102 may also include means, such as the processor 202, the communication modules(s) 206, or the like, for rounding each implicit locations data entry at Block 515 and for clustering each rounded implicit locations data entry intro groupings at Block 520. The identification server 102 may receive location data from a variety of sources as described herein and, in some instances, may receive implicit locations data entries which correspond to the same geographic location, yet have different geographic coordinates (e.g., a latitude and a longitude). By way of example, a location source device and associated user profile may request a renderable data object at a shopping center, mall, grocery store, etc. on separate occasions in time, but may receive different geographic coordinates (e.g., and therefore different implicit locations data). This difference may be attributed to the geographic size of the location in question, the precision of the positioning systems of the location source device, error in data transmission, and/or the like. However, embodiments of the present invention may employ the clustering method 500, in particular at Blocks 515 and 520, to attribute each of these implicit locations data entries to the same geographic location.

As shown in FIG. 5, the identification server 102 may round each implicit locations data entry (e.g., to two (2) decimal places) at Block 515, and the identification server 102 may group each of these implicit locations data entries into similar groupings based upon this rounding procedure. While described herein with reference to two (2) decimal places, the present disclosure contemplates that any rounding procedure may be used based upon the application at issue. For example, in instances in which distinct geographic locations are densely populated (e.g., an urban city center), additional decimals may be included to increase the resolution of the rounded implicit locations data. In contrast, in instance in which distinct geographic locations are sparsely populated, (e.g., a national forest). Fewer decimals may be included to decrease the resolution of the rounded implicit locations data.

The identification server 102 may further include means, such as the processor 202, the communication modules(s) 206, or the like, for determining a frequency score for each grouping based on the number of rounded implicit locations data entries in each grouping at Block 525. To further improve the accuracy of determinations of renderable data objects that are proximate the location source device or frequent locations of the location source device, a frequency determination may be used by the identification server 102 at Block 525. The identification server 102 may count the total number of implicit locations data entries within each grouping of Block 520 and may assign a frequency score corresponding to the number of rounded implicit locations data entries in said grouping. The use of a frequency calculation in the clustering method 500 allows for the identification server 102 to more accurately determine the geographic locations where the user is frequently located so as to provide renderable data objects proximate these locations.

In some embodiments, the method 500 may include weighting each grouping based upon a time stamp associated with each of the implicit locations data entries at Block 530. By way of example, in an instance in which various groupings possess equivalent frequency scores (e.g., the same number of implicit locations data entries in separate groupings), a weighting step may be used to further differentiate groupings. Said differently, a user and associated location source device may be located equally frequently at two locations (e.g., an office address and a residential address). In order to further separate these groupings, in some embodiments, the identification server 102 may weight requests for renderable data objects via ordering each request by the time stamp associated with each request. In particular, the identification server 102 may order requests for a renderable data object by the location source device having a lower time stamp (e.g., a smaller mathematical difference between the current time, via a clock or the like, and the time stamp associated with each request for a renderable data object) higher relative to other implicit locations data. In these instances, the rounded implicit locations data corresponding to a recent previous request for a renderable data object (e.g., having a lower time stamp) may be considered more accurate than older in time requests, for example in the instance in which a user relocates to a new city. By utilizing such a weighting step that accounts for the time stamp of the implicit locations data, the method 500 may ensure that the epicenter of the geographic area corresponds to at least one implicit locations data entry rather than the center of mass of the clustered and ranked implicit locations data.

Furthermore, in some embodiments, the method 500 may also include means, such as the processor 202, the communication modules(s) 206, or the like, for querying an explicit locations database associated with the user profile to identify explicit locations data. As described in detail with reference to FIGS. 3-4, the explicit locations data may include data that relates to known or otherwise stored fixed locations (e.g., a latitude and a longitude) such as a user profile's billing address, shipping address, work address, and the like. In such an embodiment, the method 500 may also utilize explicit locations data in conjunction with the implicit locations data in each of the rounding and clustering method steps at Blocks 515, 520, respectively. The use of explicit locations data in conjunction with the implicit locations data in method 500 may serve to further improve the accuracy of determining proximate data objects and may more accurately model conversion rates for particular renderable data objects.

With reference to FIG. 6, a method for identifying a proximate data object 600 is illustrated. As described above with reference to FIG. 3, the identification server 102 may include means, such as the processor 202, the communication modules(s) 206, or the like, for querying a renderable object database to generate a set of one or more renderable data objects based upon one or more coranked locations of a coranked locations data set, wherein each of the one or more renderable data objects is associated with one or more object redemption locations at Block 605. Once the identification server 102 generates a set of one or more renderable data objects having one or more object redemption locations, the identification server 102 may include means, such as the processor 202, the communication modules(s) 206, or the like, for comparing each of the one or more object redemption locations with each of the one or more coranked locations at Block 610. In some embodiments, this comparison is the mathematical difference between the geographic coordinates of each data entry. This comparison between each object redemption location and each coranked location is determined as a proximity score at Block 615 as described above.

In some embodiments, the comparison between each object redemption location and each coranked location may account for road closures, natural obstacles, traffic patterns, and the like in order to serve as an effective distance between each object redemption location and each coranked location. Said another way, the identification server 102 may determine a proximity score at Block 615 that comprises an effective distance between the two geographic coordinates (e.g., as opposed to a straight line distance). In such an embodiment, the proximity score may more accurately represent the distance between each ranked location and each object redemption location so as to provide proximate data objects that more accurately describe a user's willingness to travel to a particular object redemption location.

Once a proximity score is determined for each renderable data object based upon its associated one or more object redemption locations, the identification server 102 may include means, such as the processor 202, the communication modules(s) 206, or the like, for ranking each object based upon its respective proximity score in ascending order such that the minimum proximity score is ranked first at Block 620. The identification server 102 may order each proximity score for each renderable data object in order to provide to the user the renderable data object having a minimum proximity score. As described above, the proximity score may function to describe a user's willingness to travel to an object redemption location in that object redemption locations having a lower proximity score may represent object redemption locations that are convenient (e.g., closest to a user's frequent locations) to the user profile. Still further, given that the one or more coranked locations represent the most frequent locations of the user profile (e.g., via the coranking of the explicit locations data and implicit locations data), the proximity score considers both fixed and mobile locations of a user profile in determining that particular user's willingness to travel.

With reference to FIG. 7, a method for determining improved renderable data objects via email 700 is illustrated. While a user may often request a renderable data object via a location source device (e.g., a mobile device) such that the identification server 102 may receive instant location data of the location source device, in some embodiments, such as renderable data objects provided via email, the instant location data of the location source device may be unavailable. Said differently, some users may subscribe to an email newsletter providing renderable data objects without the use of a location source device. In such an embodiment, the identification server 102 may include means, such as the processor 202, the communication modules(s) 206, or the like, for receiving a request for a renderable data object from a user profile via email at Block 705 and for determining if instant location data for the user profile is available at Block 710.

If instant location data for the user profile is available at Block 710, the identification server 102 may include means, such as the processor 202, the communication modules(s) 206, or the like, for comparing the instant location data with each of the one or more object redemption locations of each of the one or more renderable data objects at Block 715 and for determining a proximity score for each of the renderable data objects with respect to the instant location data at Block 720. In contrast, if instant location data for the user profile is unavailable at Block 710, the identification server 102 may include means, such as the processor 202, the communication modules(s) 206, or the like, for comparing one or more coranked locations of a coranked locations data set with each of the one or more object redemption locations of each of the one or more renderable data objects at Block 730 and for determining a proximity score for each of the renderable data objects with respect to each of the one or more coranked locations at Block 735. Once a proximity score is determined by either set of steps, the identification server 102 may include means, such as the processor 202, the communication modules(s) 206, or the like, for identifying and transmitting a proximate data object at Blocks 725, 740, respectively.

The method 700 of FIG. 7 may operate similar to the above description of the methods 300, 400, and 600 of FIGS. 3, 4, and 6. However, the method 700 differs at Block 710 in determining whether or not instant device location data is present. As would be understood by one of ordinary skill in the art in light of the present disclosure, the identification server 102 may utilize the methods described herein to improve providing renderable data objects (e.g., determining the most appropriate proximate data object) via multiple sources of coranked locations data. However, in some embodiments in which instant location data of the location source device is unavailable (e.g., an email implemented embodiment), the identification server 102 may be required to determine a proximity score for each of the renderable data objects based only upon data of a coranked locations data set. However, in some email implemented embodiments, the identification server 102 may also receive instant location data for the user profile (via manual user input) which may further improve the accuracy of the proximity score determination.

With reference to FIG. 8, a method for determining improved renderable data objects via a web-based service 800 is illustrated. While a user may often request a renderable data object via a location source device such that the identification server 102 may receive instant location data of the location source device, in some embodiments, such as renderable data objects provided via a web application, the instant location data of the location source device may be unavailable. By way of example, in some embodiments, a user may input a search request for a renderable data object via a search engine or the like at Block 805. In response, the identification server 102 may similarly track the method 300 of FIG. 3, but may rank the sources of location data as shown in method 800 of FIG. 8.

In such an embodiment, the identification server 102 may include means, such as the processor 202, the communication modules(s) 206, or the like, for extracting search location data from an input search query of the user profile at Block 810 and extracting drop down location data from a user input at Block 815. By way of example, a user may input a search request for renderable data objects in San Francisco, and the identification server 102 may extract this location data from the input search query. Similarly, a user may be provided a drop-down input request to further narrow their location. For example, the drop-down data input may request that the user select a particular area of San Francisco.

Additionally, the identification server 102 may include means, such as the processor 202, the communication modules(s) 206, or the like, for receiving instant location data associated with a location source device associated with the user profile at Block 820 and for querying an explicit locations database associated with the user profile to identify explicit locations data at Block 825. Description of this process is provided more fully in reference to FIG. 3 above, and the method 800 performs a similar process at these steps. The identification server 102 may also include means, such as the processor 202, the communication modules(s) 206, or the like, for extracting IP location data mapped to a device associated with the user profile at Block 830. In some embodiments, the internet protocol address may provide additional location data for consideration by the identification server 102. As shown in FIG. 8, the identification server 102 may, in some embodiments, not receive instant location data at Block 820, such as when the search query is inputted by the user without a location source device (e.g., via a device that does not independently transmit its location).

Furthermore, methods 700 and 800 refer to instances in which a user may request a renderable data object via a location source device when the instant location data of the location source device may be unavailable (e.g., via email and/or a web-based service). However, in some embodiments, even if the instant location data of the location source device is determined (e.g., at Blocks 715, 820, respectively), the methods 700, 800 may utilize the instant location data of the location source device in conjunction with implicit locations data and/or explicit locations data to identify proximate data objects. Said differently, in instances in which the methods 700, 800 receive instant location data, the methods may also use the co-ranking and clustering methods 400, 500 to provide proximate data objects relative not only the instant location, but relative one or more of the implicit and/or explicit locations.

FIGS. 3-8 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions. For example, in reference to FIGS. 3-8, one or more of the procedures described herein may be embodied by computer program instructions. In this regard, the computer program instructions which embody the procedures described above may be stored by a memory 204 of an apparatus employing an embodiment of the present invention and executed by a processor 202 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-8 when executed, convert a computer or processing circuitry into a particular machine configured to perform an example embodiment of the present invention. Accordingly, the operations of FIGS. 3-8 define an algorithm for configuring a computer or processing to perform an example embodiment. In some cases, a general purpose computer may be provided with an instance of the processor which performs the algorithms of FIGS. 3-8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining improved data objects, the method comprising:

receiving a request for a renderable data object from a location source device associated with a user profile;

receiving instant location data associated with the location source device;

querying an explicit locations database associated with the user profile to identify explicit locations data;

generating an explicit locations data set based on the explicit locations data;

querying an implicit locations database associated with the user profile to identify implicit locations data;

generating an implicit locations data set based on the implicit locations data and the instant location data of the location source device;

coranking the explicit locations data set and the implicit locations data set to generate a coranked locations data set comprising one or more coranked locations;

querying a renderable objects database to generate a set of one or more renderable data objects based upon the one or more coranked locations of the coranked locations data set, wherein each of the one or more renderable data objects is associated with one or more object redemption locations;

comparing the one or more coranked locations of the coranked locations data set with each of the one or more object redemption locations of each of the one or more renderable data objects to determine a proximity score for each of the renderable data objects with respect to each of the one or more coranked locations;

ranking each of the one or more renderable data objects based upon proximity score to generate a proximate object set;

identifying a proximate data object, wherein the proximate data object of the proximate object set comprises the renderable data object having a minimum proximity score;

supplying the proximate data object to a predictive model in order to improve subsequent determinations of improved data objects; and transmitting the proximate data object to the location source device.

2. The method according to claim 1, wherein the coranking of the explicit locations data set and the implicit locations data set further comprises:
comparing the explicit locations data set with the implicit locations data set to determine one or more verified locations in an instance in which the explicit locations data and the implicit locations data satisfy a proximity threshold;
generating the coranked locations data set comprising:
first ranking the one or more verified locations;
second ranking the implicit locations data that does not satisfy the proximity threshold; and
third ranking the explicit locations data that does not satisfy the proximity threshold.

3. The method according to claim 1, wherein the explicit locations data of the explicit locations database includes location data corresponding to one or more of the billing address, the shipping address, and/or the social media of the user profile associated with the location source device.

4. The method according to claim 1, wherein the implicit locations database comprises implicit locations data gathered via one or more previous requests for a renderable data object by the location source device.

5. The method according to claim 1, wherein the implicit locations data and the explicit locations data are grouped via a clustering method.

6. The method according to claim 5, wherein the implicit locations data is further grouped via a modified k-means clustering method, wherein the location data associated with requests for a renderable data object by the location source device having a lower time stamp are ranked higher relative other implicit locations data.

7. The method according to claim 1, wherein the proximity score comprises a mathematical difference between location data entries of the one or more coranked locations of the coranked locations data set and location data entries of the one or more object redemption locations associated with the one or more renderable data objects.

8. A computer program product comprising at least one non-transitory computer-readable storage medium having computer-executable program code instructions stored therein, the computer-executable program code instructions comprising program code instructions for:
receiving a request for a renderable data object from a location source device associated with a user profile;
receiving instant location data associated with the location source device;
querying an explicit locations database associated with the user profile to identify explicit locations data;
generating an explicit locations data set based on the explicit locations data;
querying an implicit locations database associated with the user profile to identify implicit locations data;
generating an implicit locations data set based on the implicit locations data and the instant location data of the location source device;
coranking the explicit locations data set and the implicit locations data set to generate a coranked locations data set comprising one or more coranked locations;
querying a renderable objects database to generate a set of one or more renderable data objects based upon the one or more coranked locations of the coranked locations data set, wherein each of the one or more renderable data objects is associated with one or more object redemption locations;
comparing the one or more coranked locations of the coranked locations data set with each of the one or more object redemption locations of each of the one or more renderable data objects to determine a proximity score for each of the renderable data objects with respect to each of the one or more coranked locations;
ranking each of the one or more data renderable objects based upon proximity score to generate a proximate object set;
identifying a proximate data object, wherein the proximate data object of the proximate object set comprises the renderable data object having a minimum proximity score;
supplying the proximate data object to a predictive model in order to improve subsequent determinations of improved data objects; and
transmitting the proximate data object to the location source device.

9. The computer program product according to claim 8, wherein the coranking of the explicit locations data set and the implicit locations data set further comprises:
comparing the explicit locations data set with the implicit locations data set to determine one or more verified locations in an instance in which the explicit locations data and the implicit locations data satisfy a proximity threshold;
generating the coranked locations data set comprising:
first ranking the one or more verified locations;
second ranking the implicit locations data that does not satisfy the proximity threshold; and
third ranking explicit locations data that does not satisfy the proximity threshold.

10. The computer program product according to claim 8, wherein the explicit locations data of the explicit locations database includes location data corresponding to one or more of the billing address, the shipping address, and/or the social media of the user profile associated with the location source device.

11. The computer program product according to claim 8, wherein the implicit locations database comprises implicit locations data gathered via one or more previous requests for a renderable data object by the location source device.

12. The computer program product according to claim 8, wherein the implicit locations data and the explicit locations data are grouped via a clustered method.

13. The computer program product according to claim 12, wherein the implicit locations data is further grouped via a modified k-means clustering method, wherein the location data associated with requests for a renderable data object by the location source device having a lower time stamp are ranked higher relative other implicit locations data.

14. An apparatus comprising at least one processor and at least one memory including computer program code, the at least one memory and the computer program code configured to, with the processor, cause the apparatus to at least:
receive a request for a renderable data object from a location source device associated with a user profile;
receive instant location data associated with the location source device;
query an explicit locations database associated with the user profile to identify explicit locations data;
generate an explicit locations data set based on the explicit locations data;
query an implicit locations database associated with the user profile to identify implicit locations data;
generate an implicit locations data set based on the implicit locations data and the instant location data of the location source device;

corank the explicit locations data set and the implicit locations data set to generate a coranked locations data set comprising one or more coranked locations;

query a renderable objects database to generate a set of one or more renderable data objects based upon the one or more coranked locations of the coranked locations data set, wherein each of the one or more renderable data objects is associated with one or more object redemption locations;

compare the one or more coranked locations of the coranked locations data set with each of the one or more object redemption locations of each of the one or more renderable data objects to determine a proximity score for each of the renderable data objects with respect to each of the one or more coranked locations;

rank each of the one or more renderable data objects based upon proximity score to generate a proximate object set;

identify a proximate data object, wherein the proximate data object of the proximate object set comprises the renderable data object having a minimum proximity score;

supplying the proximate data object to a predictive model in order to improve subsequent determinations of improved data objects; and transmit the proximate data object to the location source device.

15. The apparatus according to claim 14, wherein the coranking of the explicit locations data set and the implicit locations data set further comprises:

comparing the explicit locations data set with the implicit locations data set to determine one or more verified locations in an instance in which the explicit locations data and the implicit locations data satisfy a proximity threshold;

generating the coranked locations data set comprising:
first ranking the one or more verified locations;
second ranking the implicit locations data that does not satisfy the proximity threshold; and
third ranking explicit locations data that does not satisfy the proximity threshold.

16. The apparatus according to claim 14, wherein the explicit locations data of the explicit locations database includes location data corresponding to one or more of the billing address, the shipping address, and/or the social media of the user profile associated with the location source device.

17. The apparatus according to claim 14, wherein the implicit locations database comprises implicit locations data gathered via one or more previous requests for a renderable data object by the location source device.

18. The apparatus according to claim 14, wherein the implicit locations data and the explicit locations data are grouped via a clustered method.

19. The apparatus according to claim 18, wherein the implicit locations data is further grouped via a modified k-means clustering method, wherein the location data associated with requests for a renderable data object by the location source device having a lower time stamp are ranked higher relative other implicit locations data.

20. The apparatus according to claim 14, wherein the proximity score comprises a mathematical difference between location data entries of the one or more coranked locations of the coranked locations data set and location data entries of the one or more object redemption locations associated with the one or more renderable data objects.

* * * * *